(No Model.)
I. W. BRAGG.
GOVERNOR CUT-OFF VAVLE GEAR.
No. 277,983. Patented May 22, 1883.
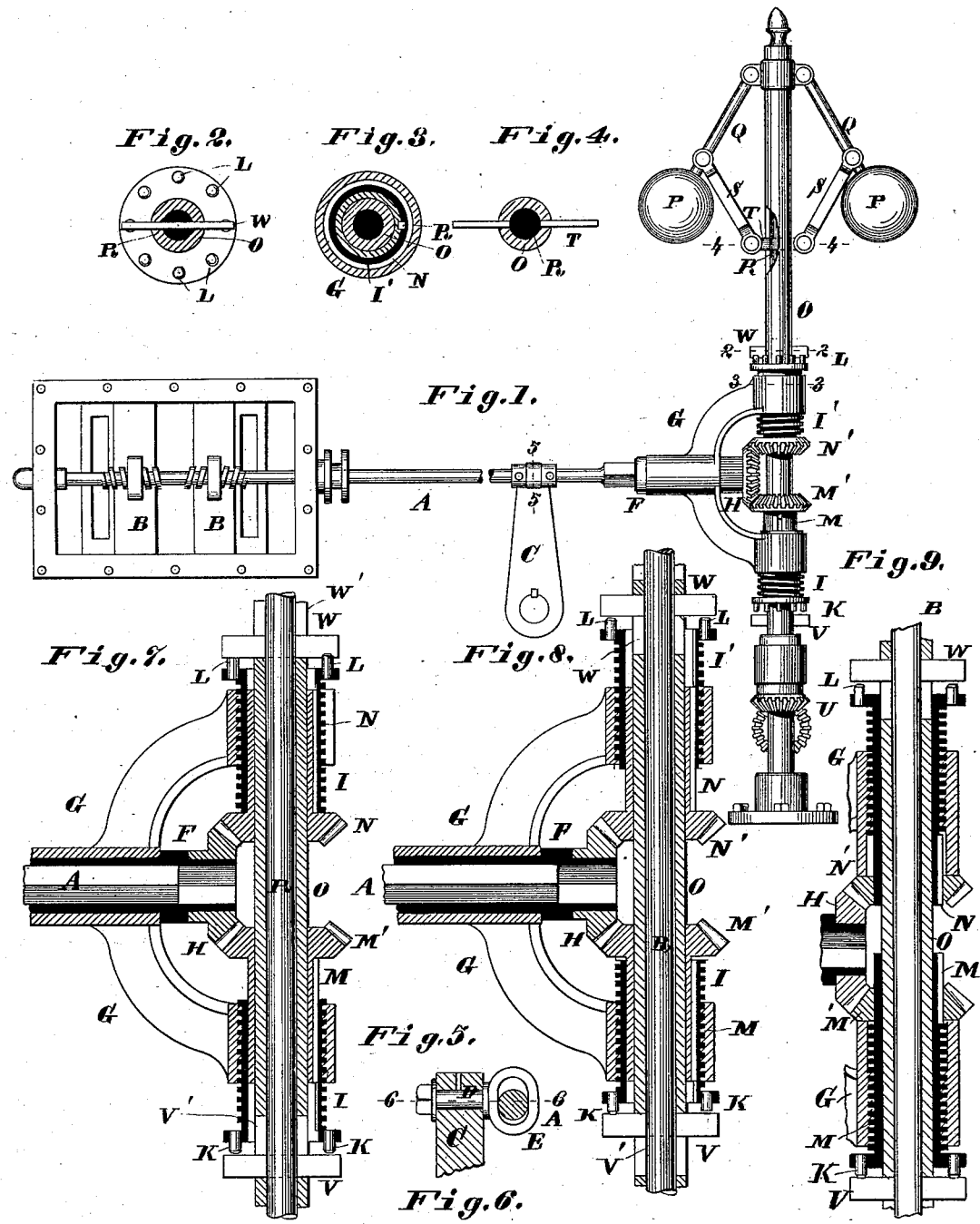
Attest:
Charles Pickles
Albert G. Fish
Inventor:
Isaac W. Bragg
By Knight Bros
attys

UNITED STATES PATENT OFFICE.

ISAAC W. BRAGG, OF KIDDER, MISSOURI.

GOVERNOR CUT-OFF-VALVE GEAR.

SPECIFICATION forming part of Letters Patent No. 277,983, dated May 22, 1883.

Application filed August 11, 1882. (No model.)

*To all whom it may concern:*

Be it known that I, ISAAC W. BRAGG, of Kidder, in the county of Caldwell and State of Missouri, have invented a certain new and useful Improvement in Governor Cut-Off-Valve Gears, of which the following is a full, clear, and exact description, reference being had to the accompanying drawings, forming part of this specification, and in which—

Figure 1 is a side elevation, showing the connection between the governor and the valves it operates. Fig. 2 is a transverse section taken on line 2 2, Fig. 1. Fig. 3 is a transverse section taken on line 3 3, Fig. 1; and Fig. 4 is a similar view taken on line 4 4, Fig. 1. Fig. 5 is a vertical section on line 5 5, Fig. 1; and Fig. 6 is a horizontal section on line 6 6, Fig. 5. Fig. 7 is a vertical section through the working parts, showing them in one position; and Fig. 8 is a similar view, showing the parts in another position; and Fig. 9 is a modification. Figs. 2, 3, 4, 5, 6, 7, 8, and 9 are on an enlarged scale from Fig. 1.

My invention relates to a clutch device which automatically regulates the position of the valves as the governor-balls rise and fall; and my invention consists in a stand having two branches, in each of which works a hollow shaft or sleeve provided with a means of clutching or engaging the driving-shaft of the governor and operating upon the valves to quicken or lengthen the cut-off, as the case be.

In the accompanying drawings, A represents a valve-stem, having on it two valves, B B, with which it has right-and-left screw-connection, and I have shown them applied to a common cylinder.

C is a rocker-arm of common construction, with which the valve-stem is connected in such a manner that while it moves backward and forward with the arm it is perfectly free to turn on its axis. I have shown it connected by means of a bolt, D, with an open head, E, through which the stem passes. The bolt is secured to the arm by a common nut. The end of the valve-stem is square, and it fits and slides freely within a sleeve, F, that turns in the governor-stand G, and has secured to its other end a miter-wheel, H. The governor-stand has two branches or arms, in the ends of which are cut right and left screws, respectively. In these arms work screw-threaded sleeves I I', the thread of each corresponding with that of its arm. The outer ends of these sleeves have outturned flanges, which are provided with projections or pins K L, respectively. Within these sleeves are hollow shafts M N, which carry, respectively, on their inner ends miter-wheels M' N', which have engagement with the wheel H on the sleeve F. There is a feather-and-groove connection between these shafts M and the sleeves I I', so that they are compelled to turn together, while the latter can slide freely endwise over the former.

Within the hollow shafts M N is the sleeve O, to which the upper ends of the governor-balls P P are pivoted by their arms Q Q, in the ordinary manner, and within the sleeve O is a rod or shaft, R, to which the governor-arms are connected by links S S and a transverse bar, T, which passes through the rod R and works in vertical slots in the governor-sleeve. Power is applied to the governor-sleeve in any ordinary way, as at U.

V and W are bars or rods, which pass transversely through the inner rod and move vertically therewith as the balls rise and fall with the different rates of speed. They work, respectively, in slots V' W' in the sleeve O.

The operation is as follows: The balls, flying apart by a high rate of speed, raise the inner bar and bring the lower bar or key, V, into engagement with the lower sleeve, I, the bar engaging the pins K, as shown in Fig. 8, turning it (the sleeve) to the right and the valve-stem to the left, thereby lengthening the valve and making the cut-off earlier. Should the balls fall, the reverse will take place—that is, the inner rod falling will bring the bar W into engagement with the sleeve L, turning it to the left and the valve-stem to the right, thereby shortening the valve. It will thus be seen that when either sleeve K L is turned it screws into the stand and withdraws itself from engagement with its bar, and, both screws being of the same pitch, the clutch-plates are always the same distance apart, for as one is screwed in the other is screwed out.

I do not wish to confine myself to the exact form of clutch shown and described, for it may be varied.

In Fig. 9 is shown another form of connection between the governor and valve-stem, wherein the sleeves I I' are dispensed with.

The hollow shafts M N screw in the ends of the stand and have flanges on their outer ends, which receive the pins K L, their inner ends being turned down, forming reduced portions, which have endwise movement through the miter-wheels M′ N′, but which are prevented from turning therein by a feather-and-groove connection therewith.

I claim as my invention—

1. The combination, with a governor and a valve-stem, with suitable gearing connecting the same, of clutches having screw-connection with the governor-stand and forming an automatic connection between the governor and stem, so that they will withdraw themselves from contact with the driver as soon as the length of the valve is adjusted to the position of the governor, as set forth.

2. The combination of stem A with valves B, stand G, with two branches, sleeve F, in which the valve-stem works, and on which is a wheel, H, hollow shafts M and N, with wheels M′ N′, engaging the wheel H, governor-sleeve O, passing through the shafts M N and carrying the balls P, rod R within the governor-sleeve and connected to the balls by links S and cross-bar T, and bars V and W, secured to the inner rod, R, and working in vertical slots in the governor-sleeve, the whole being constructed, substantially as shown and described, with a means for a suitable clutch-connection between the hollow shafts M and N and the bars V and W, so that as the balls rise and fall they act automatically upon the valves to increase or diminish their cut, as set forth.

3. The combination of stem A with valves B, stand G, with two branches, sleeve F, in which the valve-stem works, and on which is a miter-wheel, H, sleeves I and I′, having, respectively right and left screw-connection in the arms of the stand, and having outturned flanges with clutch-pins K L, hollow shafts M and N, having groove-and-feather connection with the sleeves I and I′, respectively, and having miter-wheels M′ N′, engaging with wheel H, governor-sleeve O, passing through the shafts M and N and carrying the governor-balls P, rod R, located within the governor-sleeve and connected to the balls by links S and cross-bar T and carrying bars V and W, working in vertical slots in the governor-sleeve as the bar is raised and lowered by the balls, and arranged to engage alternately the pins K and L, to automatically lengthen and shorten the valves as the balls rise and fall, as set forth.

ISAAC W. BRAGG.

Witnesses:
A. R. SPRAGUE,
J. J. BARNARD.